US012801441B2

(12) United States Patent
Denich et al.

(10) Patent No.: US 12,801,441 B2
(45) Date of Patent: Nov. 17, 2026

(54) METHOD FOR ALLOCATING RESOURCES OF A VEHICLE, METHOD FOR GENERATING A GRAPH FOR A VEHICLE, AND COMPUTER-READABLE STORAGE MEDIUM

(71) Applicant: Bayerische Motoren Werke Aktiengesellschaft, Munich (DE)

(72) Inventors: Christian Denich, Munich (DE); Benjamin Quattelbaum, Munich (DE); Sabrina Denich, Munich (DE); Daniel Bartoschek, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 479 days.

(21) Appl. No.: 18/552,881

(22) PCT Filed: Feb. 11, 2022

(86) PCT No.: PCT/EP2022/053357
§ 371 (c)(1),
(2) Date: Sep. 27, 2023

(87) PCT Pub. No.: WO2022/238020
PCT Pub. Date: Nov. 17, 2022

(65) Prior Publication Data

US 2024/0160489 A1 May 16, 2024

(30) Foreign Application Priority Data

May 10, 2021 (DE) ..................... 10 2021 112 160.4

(51) Int. Cl.
*G06F 3/00* (2006.01)
*G06F 9/50* (2006.01)

(52) U.S. Cl.
CPC .......... *G06F 9/5038* (2013.01); *G06F 9/5072* (2013.01); *G06F 2209/5019* (2013.01)

(58) Field of Classification Search
CPC .......................................................... G06F 9/50
See application file for complete search history.

(56) References Cited

U.S. PATENT DOCUMENTS 2,968,876 A * 1/1961 Mcintosh ............... G09B 19/14 434/305
5,168,441 A * 12/1992 Onarheim .......... G05B 19/0426 700/87

(Continued)

FOREIGN PATENT DOCUMENTS

CN 112204526 A 1/2021
WO WO-2008035489 A1 * 3/2008 ............. G01C 21/36

OTHER PUBLICATIONS

Jialing Liu, Phase Transitions on Fixed Connected Graphs and Random Graphs in the Presence of Noise. (Year: 2008).*

(Continued)

*Primary Examiner* — Lechi Truong
(74) *Attorney, Agent, or Firm* — Maginot, Moore & Beck LLP

(57) ABSTRACT

A method for allocating resources of a vehicle includes providing a graph. The graph includes a plurality of nodes which are interconnected via edges. Each node is representative of at least one vehicle function. Each edge is representative of a probability of a transition from one of the plurality of nodes to another of the plurality of nodes. The method also includes determining an activated vehicle function which is operated during a journey, and allocating the activated vehicle function to a first node of the plurality of nodes. The method further includes determining the probability of transition of the allocated first node to a further (Continued)

node of the plurality of nodes, and allocating the resources of the vehicle depending on the determined transition probability.

18 Claims, 2 Drawing Sheets

(56) References Cited

U.S. PATENT DOCUMENTS

| | | | | |
|---|---|---|---|---|
| 8,423,538 | B1 * | 4/2013 | Sadikov | G06F 16/90335 707/706 |
| 8,793,599 | B1 * | 7/2014 | Lajoie | G06F 30/00 715/764 |
| 11,112,795 | B1 * | 9/2021 | Mandi | G08G 1/0112 |
| 2006/0143205 | A1 * | 6/2006 | Fuchs | G06F 16/168 |
| 2011/0210973 | A1 * | 9/2011 | Di Crescenzo | H04L 43/18 345/440 |
| 2012/0167075 | A1 * | 6/2012 | Tepper | G06F 8/60 717/178 |
| 2013/0080641 | A1 | 3/2013 | Lui et al. | |
| 2014/0289638 | A1 * | 9/2014 | Becker | H04L 41/024 715/738 |
| 2015/0294223 | A1 | 10/2015 | Brown | |
| 2017/0004365 | A1 * | 1/2017 | Ono | B60K 35/10 |
| 2018/0102987 | A1 * | 4/2018 | Yun | H04L 49/208 |
| 2019/0332667 | A1 * | 10/2019 | Williams | G06N 5/022 |
| 2020/0398428 | A1 * | 12/2020 | Murray | B25J 9/1605 |
| 2021/0072033 | A1 * | 3/2021 | Husain | H04W 12/106 |
| 2021/0133057 | A1 * | 5/2021 | Hayes | G06F 11/2007 |
| 2021/0141673 | A1 | 5/2021 | Botero Halblaub et al. | |
| 2021/0241625 | A1 * | 8/2021 | Elisha | G08G 1/202 |
| 2022/0035372 | A1 * | 2/2022 | Saunders | G05D 1/0088 |
| 2022/0197306 | A1 * | 6/2022 | Cella | G05D 1/0297 |
| 2022/0258756 | A1 * | 8/2022 | Choi | B60K 35/22 |
| 2024/0086432 | A1 * | 3/2024 | Zarokian | G06N 5/01 |

OTHER PUBLICATIONS

Malintha Amarasinghe, Cloud-Based Driver Monitoring and Vehicle Diagnostic with OBD2 Telematics. (Year: 2015).*

International Search Report corresponding to International Patent Application No. PCT/EP2022/053357, dated May 16, 2022 (4 pages).

Written Opinion corresponding to International Patent Application No. PCT/EP2022/053357, dated May 16, 2022 (8 pages).

German Search Report corresponding to German Patent Application No. 10 2021 112 160.4, dated Jan. 19, 2022. (9 pages).

English Translation of Chinese Office Action corresponding to Chinese Patent Application No. 202280020043.9, dated May 19, 2026. (10 pages).

* cited by examiner

METHOD FOR ALLOCATING RESOURCES OF A VEHICLE, METHOD FOR GENERATING A GRAPH FOR A VEHICLE, AND COMPUTER-READABLE STORAGE MEDIUM

The present application is the U.S. national phase of PCT Application PCT/EP2022/053357 filed on Feb. 11, 2022, which claims priority of German patent application No. 102021112160.4 filed on May 10, 2021, which is incorporated herein by reference in its entirety.

Method for allocating resources of a vehicle, method for generating a graph for a vehicle, and computer-readable storage medium

TECHNICAL FIELD

The disclosure relates generally to allocating resources of a vehicle, and to generating a graph for a vehicle.

BACKGROUND

One aim to be achieved is to provide a method with which a vehicle is particularly efficiently operated. A further aim is to provide a device and a computer program which can carry out a method of this type. In addition, a computer-readable storage medium having a computer program of this type is intended to be provided.

SUMMARY

One or more aims disclosed herein are achieved by the methods and the subject-matter of at least some embodiments described herein.

The method for allocating resources of a vehicle will first be explained. The vehicle is, for example, a motor vehicle, such as, for example, a passenger vehicle, a truck, a transporter and/or a motorcycle. Alternatively, the vehicle can be an aircraft or watercraft.

The vehicle comprises, for example, a system, in particular an on-board unit. The system is, in particular, an embedded system. The system is designed, for example, to monitor and/or to control and/or to regulate at least one vehicle function and/or to process data. The system comprises, for example, at least one processor, at least one memory, at least one transmit device and/or at least one receive device.

The system is designed, for example, to allocate predefined resources to each vehicle function, said resources being required for the operation of the vehicle function. The resources are, in particular, electrical engineering and/or communication engineering resources. The resources are, for example, a processor power, a memory space and/or a data traffic resource, such as, for example, an upload volume, a download volume, an upload speed and/or a download speed.

According to at least one embodiment of the method, a graph is provided. A graph is provided, for example, in each case to a plurality of vehicles.

According to at least one embodiment of the method, each graph comprises a plurality of nodes which are interconnected in each case by edges. At least one attribute is allocated to each edge. The edges are, in particular, directional edges.

According to at least one embodiment of the method, the nodes are representative of at least one vehicle function. The vehicle comprises, for example a multiplicity of vehicle functions. The vehicle function is, for example, a vehicle application, in particular application software. At least one setting of the vehicle function is predefined, for example, by a user of the vehicle. This means that the user can perform the setting of the vehicle function.

The vehicle function relates, for example, to a navigation function, a multimedia function and/or at least one vehicle setting. The at least one vehicle setting comprises, for example, settings relating to at least one driver assistance system of the vehicle.

According to at least one embodiment of the method, the edges are representative in each case of a probability of transition from one of the nodes to another of the nodes. The attribute which is allocated to each edge is, for example, a weighting which is representative of the transition probability of the nodes directly adjacent to the edge.

The transition probability indicates, in particular, how probable it is that the user of the vehicle will end one vehicle function activated by the user and comprised of one of the nodes, and will activate another vehicle function which is comprised of another node. In other words, the transition probability indicates, for example, a probability which is representative of a change of the vehicle functions. The change is, for example, predefined by the user.

According to at least one embodiment of the method, an activated vehicle function is determined which is operated during a journey. The journey corresponds, for example, to a time interval from a start-up of the vehicle to a shutdown of the vehicle.

The activated vehicle function is performed, for example, actively during the journey and is, in particular, started and/or operated by the user. The activated vehicle function draws on resources of the vehicle, particularly during the journey.

According to at least one embodiment of the method, the activated vehicle function is allocated to one of the nodes. The activated vehicle function is compared, for example, by means of a comparison rule with the vehicle functions which are comprised of the nodes. If, for example, a vehicle function which is comprised of a node is identical to the activated vehicle function, the activated vehicle function is allocated to this node.

According to at least one embodiment of the method, the probability of transition of the allocated node to one of the other nodes is determined. The edges adjacent to the allocated nodes, for example, are also determined by determining the activated vehicle function. The existing transition probabilities, for example, of another node, in particular another vehicle function, being activated by the user are therefore predefined.

According to at least one embodiment of the method, the resources of the vehicle are allocated depending on the determined transition probability. Allocation means here, for example, that an allocation of resources is reduced depending on the transition probability of the other node which is connected to the allocated node.

If the probability of transition to the other node is designed, for example, as comparatively low, the vehicle function allocated to the other node is at least temporarily restricted or at least temporarily deactivated. This means that the resources are allocated to the vehicle function that is allocated to the other node in such a way that said vehicle function consumes fewer of the resources. The vehicle function allocated to the other node consumes, for example, comparatively few resources due to the restriction or deactivation. The processor power, the memory space and/or the data traffic resources, for example, are therefore reduced, so that these resources are available to other vehicle functions, in particular the activated vehicle function.

Vehicle functions which are comparatively less likely to be used by the user of the vehicle are advantageously restricted with a method of this type. Comparatively few resources are therefore advantageously required.

According to at least one embodiment of the method, each node is representative of a combination of a displayed content of a display device and the vehicle function. The vehicle comprises, for example, at least one display device, in particular a plurality of display devices. The display device is designed to display the respective vehicle function activated by the user visually to the user. In particular, each of the display devices is designed to display each of the vehicle functions which are activated by the user.

The display device is, for example, a head-up display, a central information display and/or an instrument cluster. In particular, the display devices can be arranged as spatially distanced from one another in the vehicle.

According to at least one embodiment of the method, the resources are allocated at least temporarily depending on a threshold value. The threshold value is, for example, representative of a transition probability at which the user changes the vehicle function. The threshold value is, in particular, predefinable.

A method for generating a graph for a vehicle is further indicated. The method for generating a graph for a vehicle is carried out, for example, temporally before the method for allocating resources of a vehicle. The provided graph in conjunction with the method for allocating resources of a vehicle is generated, for example, by the method for generating a graph for a vehicle. All features and embodiments disclosed in conjunction with this method are therefore also disclosed in conjunction with the method for allocating resources of the vehicle, and vice versa.

According to at least one embodiment, a temporary graph is provided.

According to at least one embodiment of the method, the temporary graph comprises nodes which comprise all possible combinations of display devices and vehicle functions of the vehicle.

According to at least one embodiment of the method, each node having two counter-directional edges is connected to each of the other nodes.

According to at least one embodiment of the method, each of the edges comprises a weighting that is representative of a transition probability.

According to at least one embodiment of the method, impossible connections of nodes are determined.

According to at least one embodiment of the method, the transition probabilities of impossible connections of nodes are set to zero.

According to at least one embodiment of the method, transition probabilities are determined during a plurality of journeys of the vehicle. Transition probabilities are determined, for example, for a plurality of journeys for a plurality of vehicles and/or a plurality of users. The transition probabilities are determined, for example, during at least 10 journeys and at most 1000 journeys, in particular at least 30 journeys and at most 300 journeys, of the vehicle.

The transition probabilities are determined, for example, during the journeys by means of a machine learning algorithm, in particular an additional momentum term.

According to at least one embodiment of the method, the graph is generated and stored depending on the determined transition probabilities.

According to at least one embodiment of the method, a plurality of graphs are generated and stored. The graphs are, in particular, representative of a plurality of journeys of one vehicle for a plurality of users, for a plurality of journeys of a plurality of vehicles for one user and/or for a plurality of journeys of a plurality of vehicles for a plurality of users.

According to at least one embodiment of the method, each graph is representative of a vehicle and/or a user of the vehicle.

According to at least one embodiment of the method, all graphs are grouped into different sets by means of a cluster algorithm. The graphs are grouped, for example, by means of a self-organizing tree algorithm, in particular a K-nearest neighbors algorithm.

The graph is initialized, for example, in the method for allocating resources of a vehicle depending on the different sets, in particular clusters. The graph is predefined, for example, in the method for allocating resources of a vehicle in such a way that it is representative of at least some of the different sets and the learned transition probabilities. In particular, the graph is predefined in the method for allocating resources of a vehicle in such a way that it is representative of the most frequently occurring sets, in particular the most frequently occurring clusters.

Vehicle functions that are comparatively little used in a special vehicle type or in the case of specific users can advantageously be identified by a grouping of this type.

A device is further indicated which is designed to carry out the method for allocating resources of a vehicle and/or the method for generating a graph for a vehicle.

A computer program is further indicated, comprising commands which, when the computer program is executed by a computer, prompt the latter to carry out at least one of the methods described herein.

A computer-readable storage medium is further indicated, on which the computer program described here is stored.

Exemplary embodiments of the invention are explained in detail below with reference to the schematic drawings.

DETAILED DESCRIPTION

Elements having the same design or function are indicated with the same reference signs in all the figures.

Figure 1:
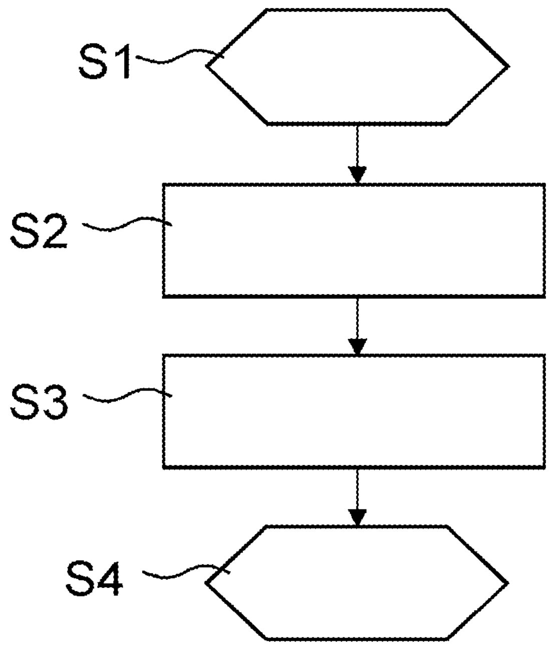
FIG. 1 shows a flow diagram of a method for generating a graph for a vehicle according to one exemplary embodiment.

In the flow diagram of the method for generating a graph for a vehicle according to the exemplary embodiment shown in FIG. 1, a method step S1 is first carried out in which a temporary graph is provided. The vehicle comprises, for example, a plurality of display devices. The temporary graph further comprises a multiplicity of nodes. Each of the nodes is representative, for example, of a combination of a displayed content of a display device and a vehicle function. The temporary graph comprises all possible combinations of display devices and vehicle functions of the vehicle.

Each node having two counter-directional edges is connected here to each of the other nodes. Each edge further comprises an attribute which corresponds to a weighting which is representative of a transition probability. The transition probability indicates how probable it is that a user will change from one combination of a display device and vehicle functions to another combination.

The weightings in method step S1 are, for example, all of identical design and all have a value, for example, of 0.5. This value corresponds to a transition probability of 50%. Alternatively, the weightings are predefined as an estimated value.

All impossible connections of nodes are then determined in a further method step S2 and the transition probabilities of impossible connections of nodes are set to 0. The impossible connections are determined, for example, by means a test automation. The remaining transition probabilities can further be more specifically defined, for example, by means of the test automation.

Transition probabilities during a plurality of journeys of the vehicle are determined in a subsequent method step S3. If, for example, the user changes from one combination of a display device and vehicle functions to another combination during a journey, the corresponding probabilities of transition between the corresponding nodes are increased.

The graph is then generated and stored according to method step S4 depending on the determined transition probabilities.

Figure 2:
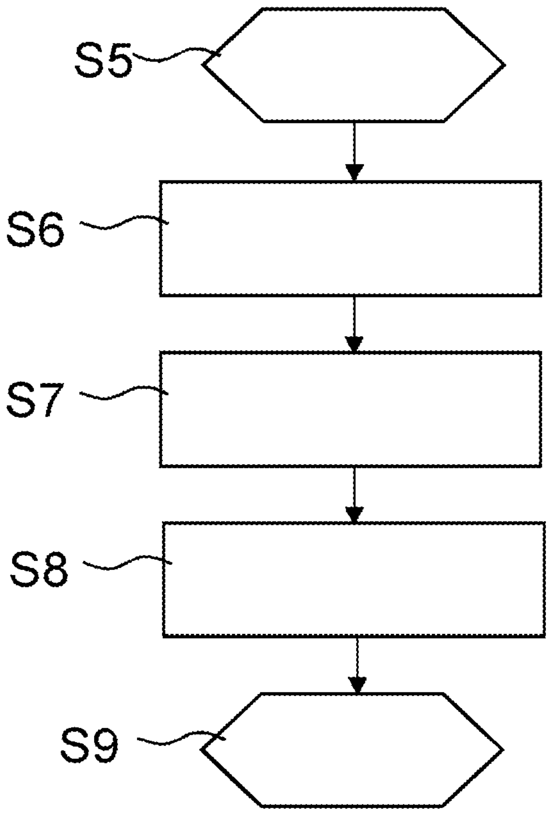
FIG. 2 shows a flow diagram of a method for allocating resources of a vehicle according to one exemplary embodiment.

In the flow diagram of the method for allocating resources of a vehicle according to the exemplary embodiment shown in FIG. 2, a method step S5 is first carried out in which the graph is provided. The graph is, in particular, the generated graph according to the exemplary embodiment shown in FIG. 1.

An activated vehicle function which is operated during a journey is then determined according to method step S6. A specific combination of a display device and vehicle functions, for example, is activated by a user of the vehicle and/or is operated by the user.

According to method step S7, the activated vehicle function is allocated to one of the nodes. In other words, the node of the graph is determined which comprises the combination of a display device and vehicle functions which is operated during the journey.

The probability of transition of the allocated node to one of the other nodes is then determined in method step S8.

In method step S9, the resources of the vehicle are allocated depending on the determined transition probability. The allocation comprises, for example, a deactivation of a vehicle function in which, depending on the determined transition probability, the user is unlikely to activate and/or operate this vehicle function. Resources are therefore no longer consumed by this deactivated vehicle function. These unconsumed resources can be made available, for example, to the activated vehicle function.

Figure 3:
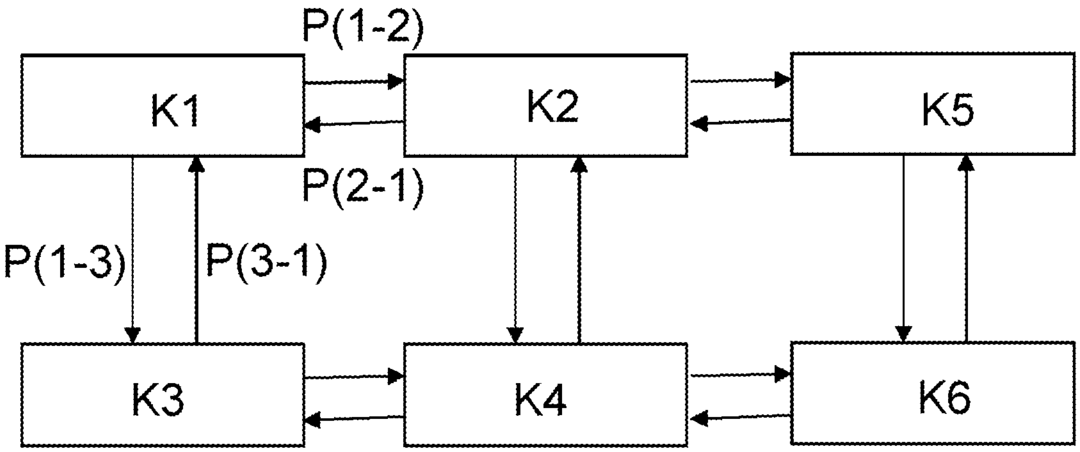
FIG. 3 shows an example representation of a graph for a vehicle.

The graph according to FIG. 3, which is allocated to a vehicle, comprises, for example, six nodes K1, K2, K3, K4, K5 and K6. Each of the nodes is interconnected with two adjacent nodes via two counter-directional edges which are shown in each case as arrows in FIG. 3.

The vehicle comprises, for example, a head-up display, a central information display and an instrument cluster. Each node comprises these display devices.

The first node K1 further comprises vehicle functions which are allocated to the display devices. The first node K1 comprises, for example, the head-up display to which a navigation function of a first provider with first information is allocated. The first node K1 further comprises the central information display to which a navigation function of the first provider is allocated.

The second node K2 comprises, for example, the head-up display to which a navigation function of a second provider is allocated. The second node K2 further comprises the central information display to which a navigation function of the second provider is allocated.

The third node K3 comprises, for example, the head-up display to which a navigation function of the first provider is allocated. The third node K3 further comprises the central information display to which a navigation function of the first provider with second information is allocated.

The transition probability P(1-2) indicates here how probable it is that a user will change from the combination of the first node K1 to the combination of the second node K2. The transition probability P(2-1) indicates how probable it is that the user will change from the combination of the second node K2 to the combination of the first node K1.

The value for the transition probability P(1-2) is, for example, 0. It is therefore excluded that the user will change from the combination of the first node K1 to the combination of the second node K2. If, for example, it is determined in the method according to FIG. 2 that the user uses the combination of the first node K1, the combination of the second node K2, in particular the vehicle function allocated to the second node K2, can be at least temporarily deactivated.

Navigation functions, for example, such as e.g. real-time traffic information, are no longer provided to the navigation function of the first provider. Furthermore, processor resources and/or memory resources are therefore advantageously saved and can be made available to the navigation function of the second provider.

The transition probability P(1-3) indicates here how probable it is that a user will change from the combination of the first node K1 to the combination of the third node K3. The transition probability P(3-1) indicates how probable it is that the user will change from the combination of the third node K3 to the combination of the first node K1.

The value for the transition probability P(3-1) and P(1-3) is, for example, 0.5. A 50-percent probability therefore exists that the user will change from the combination of the first node K1 to the combination of the third node K3.

If, for example, it is determined in the method according to FIG. 2 that the user uses the combination of the first node K1, the combination of the third node K3, in particular the vehicle function allocated to the third node K3, is not deactivated.

Figure 4:
FIG. 4 shows a schematic representation of a device according to one exemplary embodiment.

The device according to the exemplary embodiment shown in FIG. 4 is designed to carry out the method according to FIG. 1 and/or 2.

The device is, for example, part of the vehicle. An on-board unit of the vehicle, for example, comprises the device. The device is, for example, part of a head unit of the vehicle, wherein the head unit comprises a business logic. The vehicle function that is active and the back-end services that are to be requested, for example, are controlled in the head unit.

For this purpose, the device 1 has, in particular, a computing unit, a program memory and a data memory, and also, for example, one or more communication interfaces. The program memory and data memory and/or the computing unit and/or the communication interfaces can be implemented in one structural unit and/or can be distributed among a plurality of structural units.

In particular, a program for determining defective vehicles which executes the method described above is stored on the program memory and data memory of the device 1 in order to carry out the method.

REFERENCE SIGN LIST

1 Device
K1 First node
K2 Second node
K3 Third node
K4 Fourth node
K5 Fifth node
P( . . . ) Transition probability
S1 . . . S9 Method steps

What is claimed is:

1. A method for allocating resources offered by a specific vehicle, comprising:
providing a graph, wherein
the graph comprises a plurality of nodes which are interconnected via edges,
each node of the plurality of nodes is representative of at least one vehicle function, and
each edge is representative of a probability of a transition from one of the plurality of nodes to another of the plurality of nodes;
wherein providing the graph further comprises:
providing a temporary graph, wherein
the temporary graph comprises temporary graph nodes which comprise a plurality of possible combinations of display devices and vehicle functions of the vehicle,
each temporary graph node having two counter-directional edges is connected to each of the other temporary graph nodes, and
each of the counter-directional edge comprises a weighting which is representative of a transition probability;
determining impossible connections of temporary graph nodes, wherein transition probabilities of the impossible connections of temporary graph nodes are set to 0;
determining transition probabilities between the possible combinations of display devices and vehicle functions during a plurality of journeys of the vehicle; and
generating and storing the graph depending on the determined transition probabilities and the temporary graph;
determining an activated vehicle function which is operated during a journey;
allocating the activated vehicle function to a first node of the plurality of nodes;
determining the a probability of transition of the allocated first node to a further node of the plurality of nodes; and
allocating the resources offered by the specific vehicle depending on the determined transition probability of transition.

2. The method as claimed in claim 1, wherein each node of the plurality of nodes is representative of a combination of a displayed content of a display device and the at least one vehicle function.

3. The method as claimed in claim 2, wherein the resources are allocated at least temporarily depending on a relationship between the determined transition probability and a threshold value.

4. The method of claim 3 wherein allocating the resources of the vehicle includes a deactivation of a vehicle function that the user is unlikely to activate or operate.

5. The method of claim 4 wherein the deactivation of the vehicle function that the user is unlikely to activate is temporary.

6. The method of claim 3 wherein allocating the resources of the vehicle is performed in a head unit of the vehicle.

7. The method of claim 2 wherein the display device is at least one of a head-up display, a central information display and an instrument cluster.

8. The method as claimed in claim 1, wherein the resources are allocated at least temporarily depending on a relationship between the determined transition probability and a threshold value.

9. The method of claim 1, wherein the temporary graph comprises temporary graph nodes which comprise all possible combinations of display devices and vehicle functions of the vehicle.

10. A device which configured to carry out the method as claimed in claim 1.

11. The method of claim 1 wherein the at least one vehicle function is a plurality of vehicle functions controlled in the head unit of the vehicle.

12. A method for generating a graph for a vehicle for use in allocating resources offered by the vehicle, the method comprising:
providing a temporary graph, wherein
the temporary graph comprises nodes which comprise a plurality of possible combinations of display devices and vehicle functions of the vehicle,
each node having two counter-directional edges is connected to each of the other nodes, and
each of the edges comprises a weighting which is representative of a transition probability;
determining impossible connections of nodes, wherein transition probabilities of the impossible connections of nodes are set to 0;
determining transition probabilities between the possible combinations of display devices and vehicle functions of the vehicle during a plurality of journeys of the vehicle; and
generating and storing the graph depending on the determined transition probabilities and the temporary graph;
wherein a plurality of graphs are generated and stored, and each graph of the plurality of graphs corresponds to the vehicle and further corresponds to a user of the vehicle; and
wherein the plurality of graphs are used to allocate resources offered by the vehicle depending on the determined transition probabilities.

13. The method as claimed in claim 12, wherein all graphs are grouped into various sets by means of a cluster algorithm.

14. A method for generating a graph and allocating resources for a vehicle, the method comprising:
providing a temporary graph, wherein
the temporary graph comprises nodes which comprise a plurality of possible combinations of display devices and vehicle functions of the vehicle,
each node having two counter-directional edges is connected to each of the other nodes, and
each of the edges comprises a weighting which is representative of a transition probability;
wherein the temporary graph comprises temporary graph nodes which comprise all possible combinations of display devices and vehicle functions of the vehicle;
determining impossible connections of nodes, wherein transition probabilities of the impossible connections of nodes are set to 0;
determining transition probabilities between the possible combinations of display devices and vehicle functions of the vehicle during a plurality of journeys of the vehicle; and generating and storing the graph depending on the determined transition probabilities and the temporary graph; and allocating resources offered by the vehicle depending on the determined transition probabilities.

15. The method as claimed in claim 14, wherein a plurality of graphs are generated and stored, and each graph of the plurality of graphs corresponds to vehicle.

16. The method as claimed in claim 15, wherein each graph of the plurality of graphs further corresponds to a user of the vehicle.

17. The method as claimed in claim 14, wherein a plurality of graphs are generated and stored, and each graph of the plurality of graphs corresponds to a user of the vehicle.

18. A computer-readable storage medium on which a computer program is stored, which when executed by a computing device, carries out the method of claim 1.

* * * * *